Sept. 14, 1937.  G. BOWMAN ET AL  2,093,003
VALVE DEVICE
Filed Sept. 27, 1935  2 Sheets-Sheet 1

Inventors:
George Bowman &
George Charles Burgess
by Byrnes, Stebbins & Blenko
attys

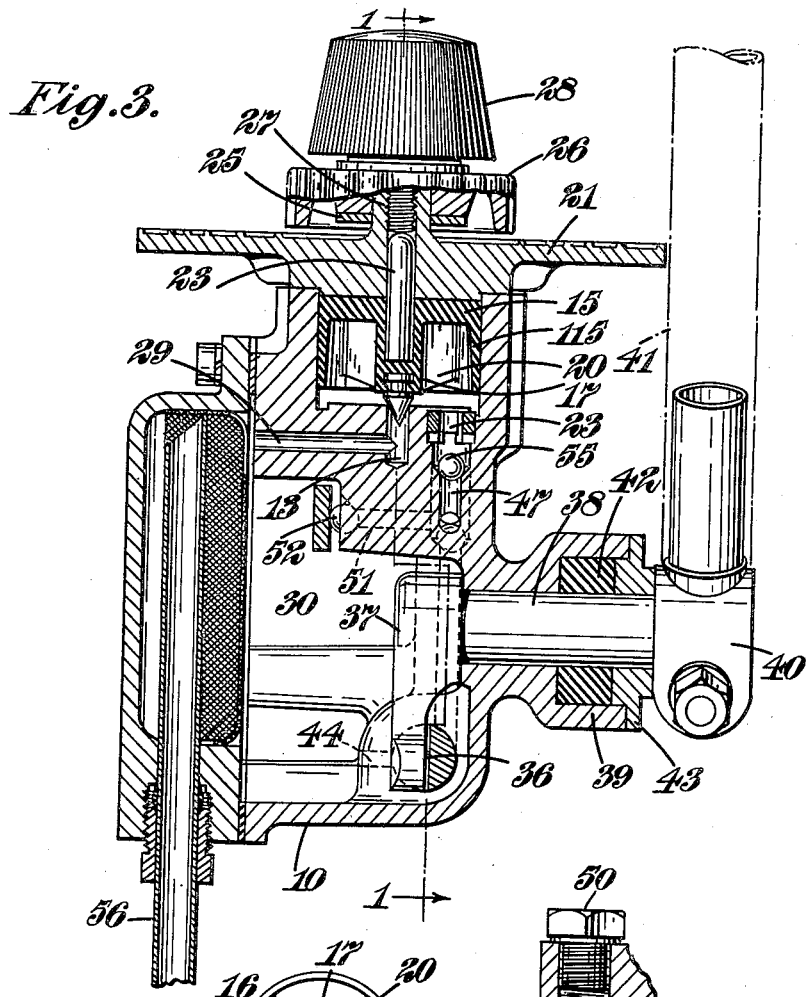
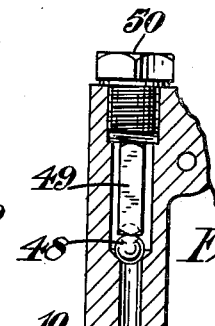
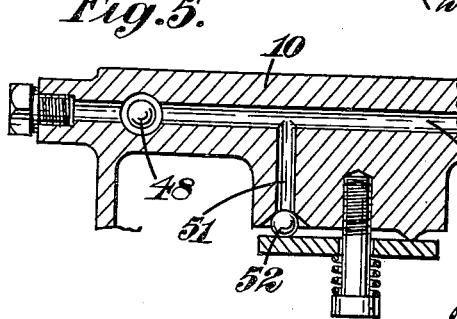

Patented Sept. 14, 1937

2,093,003

UNITED STATES PATENT OFFICE 2,093,003

VALVE DEVICE

George Bowman, London, and George Charles Burgess, Wembley, England, assignors to S. Smith & Sons (Motor Accessories) Limited, London, England, a British company Application September 27, 1935, Serial No. 42,550
In Great Britain October 4, 1934

6 Claims. (Cl. 121—46.4)

This invention relates to hydraulic power transmission apparatus and in one application the invention is concerned with apparatus for the control and operation of hydraulically operated lifting jacks for vehicles.

The invention comprises in or for a hydraulic power transmission apparatus, a distributing valve comprising a valve chamber having a plurality of ports in a wall thereof, a valve member in the chamber and provided with a plurality of projecting valve parts movable towards and away from the side wall to close and open the ports, and a control device for operating the valve parts.

A feature of the invention consists in the provision of a valve member which is formed of a pliable material such as rubber, and in a preferred construction this valve member is formed to provide at the periphery, a liquid-tight seal upon the adjacent walls of the valve chamber.

According to a further feature of the invention the control device aforesaid comprises means for tilting or deforming the valve member in order selectively to move the valve parts thereof into and out of co-operation with the corresponding ports. In one construction there is provided a plurality of sliders each movable to press a valve part against a valve seating in the co-operating port.

Preferably there is provided a rotatable operating face cam in engagement with the sliders in order to control the several ports. Furthermore an additional valve part and operating slider may be provided together with independent means for actuating the slider.

According to another feature of the invention the valve member aforesaid comprises a rubber disc formed with a cup sealing flange at the periphery, a plurality of projecting bosses on one face forming or carrying the aforesaid valve parts, and recesses in the opposite face entering into the bosses to receive operating sliders by means of which the bosses are deformed to control the port openings. These sliders may be actuated as aforesaid by a rotatable face cam. In a preferred construction each of the bosses aforesaid carries a metallic valve part for engagement with the corresponding valve port.

According to another feature of the present invention there is provided in or for a hydraulic power transmission apparatus, for example, in conjunction with the distributing valve aforesaid, a double-acting reciprocating pump for supplying liquid under pressure and comprising a bar constituting a double-ended piston working at opposite ends in opposed cylinders, fluid conduits for the supply of operating fluid to the cylinders, which conduits are closed by the respective pistons at the commencement of the working stroke and an oscillating crank engaging in a lateral intermediate recess in the double-ended piston. Preferably a reservoir for operating fluid communicating with the inner ends of the cylinders is provided in which reservoir the oscillating crank is conveniently mounted. In a preferred construction the cylinders of the pump are formed integrally in the lower part of the reservoir, so that the piston and the inner ends of the cylinder are submerged in the operating fluid.

In one specific application of the invention the distributing valve and the pump as aforesaid are constructed as a unit in which the valve chamber is formed integrally with the cylinders and reservoir of the pump. This construction is especially intended for operating and controlling lifting jacks on a vehicle, the valve controlling the jack or jacks to be operated and a reciprocating pump supplying the necessary fluid pressure for operating the jacks.

One specific embodiment of the invention comprising both distributing valve and pump primarily for controlling and operating a jacking system, is shown by way of example in the accompanying drawings in which:—

Figure 1:
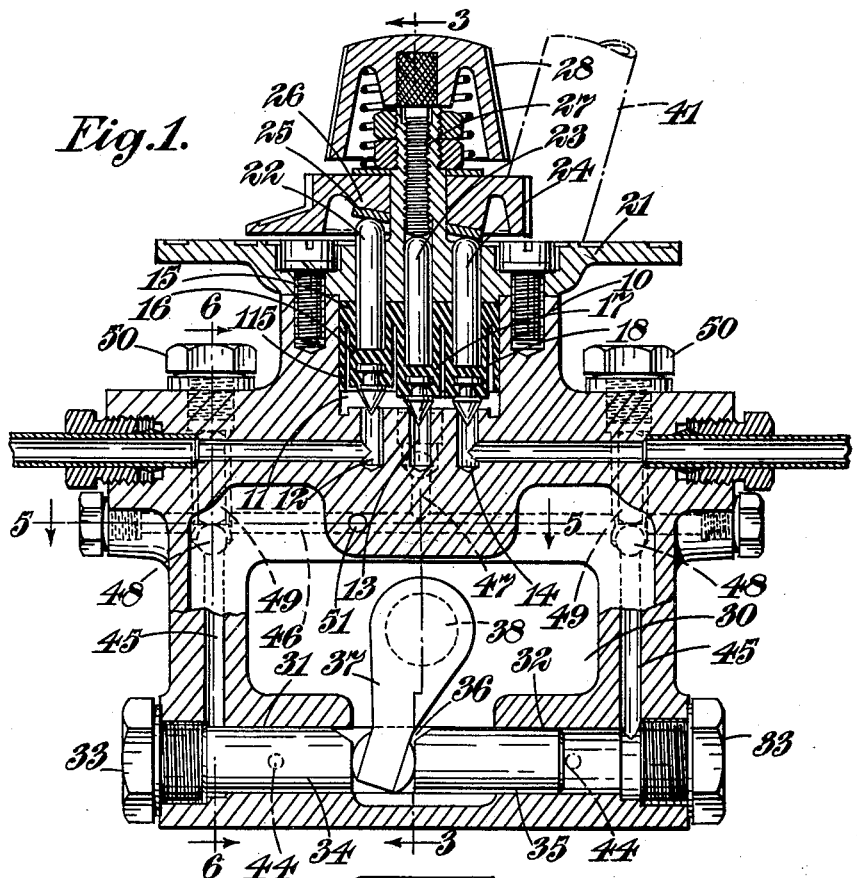
Figure 1 is a cross-section of the apparatus taken on line 1—1 of Figure 3.
Figure 2:
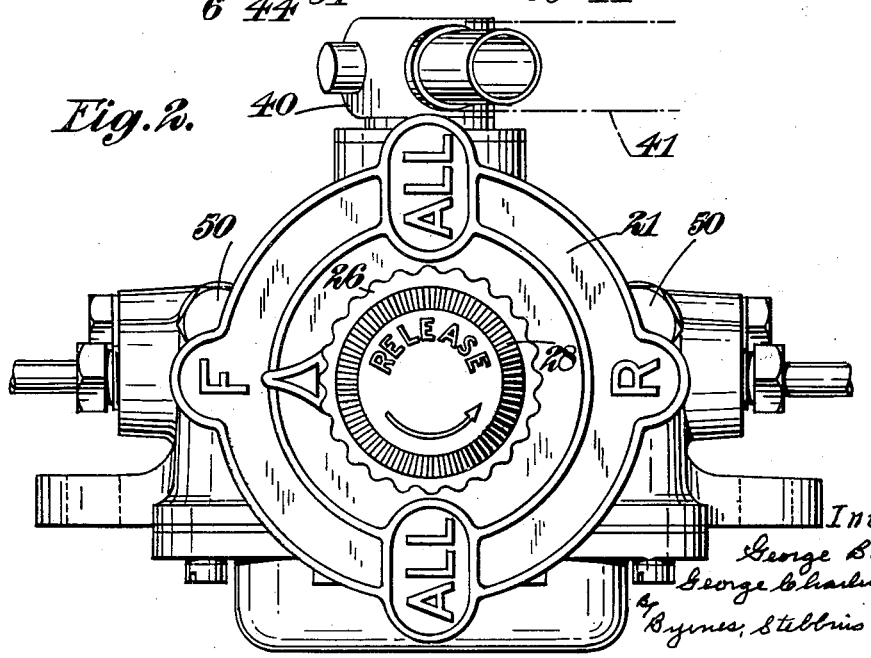
Figure 2 is a plan.

Figure 3 is a cross-section at right angles to Figure 1, and on line 3—3 of Figure 1, Figure 4 is an underneath view of the valve member, and Figures 5 and 6 are detailed views, Figure 5 being a section on line 5—5 of Figure 1 and Figure 6 being a section on line 6—6.

Referring to the drawings there is provided a housing 10 forming a valve chamber 11 of cylindrical form and in the lower face wall there is provided two outlet ports 12 and 14, an inlet port 23 (Figure 3) and a return or release port 13. The ports 12 and 14 are controlled by the controllable valve member of the distributing valve.

Within the valve chamber 11 there is provided a valve member 15 of soft rubber in the shape of a disc (see Figure 4) and provided with a flange 115 at the periphery so that the pressure of the fluid in the valve chamber tends to produce a tight seal between this flange and the adjacent wall of the valve chamber. On the inner side the valve member 15 is provided with three bosses, 16, 17 and 18 each provided at its outer extremity with a metal seating member 19 moulded in position, and having a projecting conical part arranged to engage in the port it is to control, as shown in Figure 1. The central boss 17 is stiffened by means of radial webs 20.

The valve chamber 11 is closed by a cover plate 21 which has holes in which sliders 22, 23 and 24 are adapted to slide. These sliders enter at their lower ends in recesses formed in the bosses 16, 17, and 18 respectively, and the sliders 22 and 24 are engaged at their upper ends by a face cam 25 carried by a rotatable control member 26. The slider 23 engages at its upper end the lower end of a screw 27, screw-threaded in an upward extension of the cover plate 21, and carrying an operating knob 28.

In one operative position of the control member 26, as shown in Figure 1, the slider 24 is moved downwardly to the maximum extent to press the corresponding valve part on the boss 18 into engagement with the port 14 in order to close this port, the slider 22 and the boss 16 being permitted to rise under the action of the pressure in the valve chamber so as to open the corresponding port 12. Thus fluid under pressure admitted at the port 23 (as hereinafter described) is thus directed through the port 12 of the distributing valve to operate lifting jacks, for example, at the front of the vehicle. By rotation of the control member 26 through 180° the port 14 is now opened by the fluid pressure and the port 12 is closed, and thus the fluid under pressure is directed from the port 14 to operate the lifting jacks at the rear of the vehicle. By movement of the control member 26 to either of the two intermediate positions both the ports 12 and 14 are opened and thus fluid under pressure is admitted to all the jacks. The valve part carried by the central boss 17 is normally forced down by the control knob 28 to close the port 13. When it is required to release the jacks this port is opened by the fluid pressure on turning back the screw 27 by its knob 28, and the fluid previously supplied to the jacks is released through the port 13 and a connecting conduit 29 to a reservoir 30 for the fluid hereinafter described.

The distributing valve is constructed as a unit with an integral pump for supplying the fluid pressure. The housing 10 is formed with two opposed pump cylinders 31, 32 formed by a single throughway in the housing closed at its outer ends by plugs 33. The inner ends of the two cylinders 31, 32 are open to the reservoir 30 formed in the housing 10 above the cylinders for containing a supply of the operating liquid.

In the cylinders 31 and 32 there is located a double-ended piston 34, 35 provided with an intermediate transverse recess 36 in which is located the outer end of a crank arm 37 located in the reservoir 30, and carried by an oscillatable shaft 38 having a bearing in the boss 39 on the housing and carrying at the exterior a bracket 40 for receiving an operating handle indicated at 41. The bearing is rendered fluid-tight by a soft rubber packing washer 42 of large dimensions retained in place by a cover plate 43.

In each cylinder a lateral inlet port 44 is provided communicating with the reservoir 30 to permit the flow of operating fluid from the reservoir 30 into the cylinder when the piston is in the retracted position. The pistons are thus submerged in the operating fluid in the reservoir from which the fluid is drawn by the pump, thus minimizing any loss in efficiency due to ill-fitting or worn pistons and cylinders. The inlet port in the wall of the cylinder is closed by the piston so that, by reciprocation of the double-ended piston by means of the control handle, fluid under pressure is delivered from the two cylinders alternately. The outer end of each cylinder is connected by a conduit 45 in the housing to a connecting conduit 46 which in turn communicates by means of a conduit 47 with the inlet port 23 of the distributing valve. In each of the conduits 45 there is provided a non-return valve 48 restricted as to its movement by a non-resilient stop 49 retained in place by means of a stud 50.

In the conduit 46 there is provided a branch 51 leading through a pressure release valve 52, to the reservoir 30. In order to ensure that the fluid pressure produced in the valve chamber 11 and interconnected lifting jacks or other fluid operating device is maintained, a further non-return valve 55 is preferably provided closely adjacent to the inlet port 23 leading to the valve chamber.

Thus in operation the control member 26 of the distributing valve is adjusted according to the direction in which the fluid is to be applied, the control knob 28 is adjusted to close the release port 13, and then the control handle 41 is manipulated to produce the necessary fluid pressure for performing the lifting or other operation. A main fluid supply is normally provided for the device and is fed into the reservoir 30 by means of the pipe 56 (Figure 3).

We claim:—

1. In apparatus of the class described, a distributing valve mechanism comprising a chamber having a plurality of ports in a wall thereof, a resilient valve member in said chamber and provided with a plurality of valve parts movable towards and away from the said wall to close and open the said ports, a plurality of sliders each movable to press a valve part into position to close the corresponding port in the valve chamber and means for selectively operating the said sliders, an additional valve part on said valve member, which additional part is movable towards and away from a co-operating port in said wall of the valve chamber, a slider for operating said additional valve part and independent operating means engaging said additional slider for controlling the corresponding valve part.

2. In apparatus of the class described, a distributing valve mechanism comprising a valve chamber having a plurality of ports in an end wall thereof, a rubber valve member in said valve chamber, which valve member is formed with a sealing flange at the periphery engaging with the adjacent side wall of the valve chamber, a plurality of projecting valve parts in one side opposite to said ports and recesses in the opposite side of said valve member and entering into said valve parts, a plurality of sliders one in each of said recesses and a control means for producing a selective movement of said sliders to press the corresponding valve parts into engagement with the co-operating ports in the wall of the valve chamber.

3. A distributing valve mechanism according to claim 2, wherein each of the valve parts on the valve member carries a metallic member for engagement with the corresponding valve port.

4. In apparatus of the class described, a distributing valve mechanism comprising a valve chamber, means for supplying fluid to the valve chamber, said valve chamber having a plurality of outlet ports in an end wall thereof, a rubber valve member in said chamber, which valve member is formed with a peripheral sealing flange engaging a side wall of said chamber in order to effect a fluid-tight seal therewith, said valve member also being provided at one side thereof with a plurality of valve parts for co-operation with the said ports, a plurality of sliders engaging the opposite side of said valve member and respectively opposite each valve part, means for independently moving one of said sliders in order to move the corresponding valve part into engagement with the co-operating port and control means operative upon the remaining sliders in order to move the corresponding valve parts selectively into engagement with the corresponding ports in the valve member.

5. A distributing valve mechanism having a plurality of ports in one end thereof, a resilient valve member disposed in said chamber opposite said ports, which valve member is formed with a cup-like sealing flange engaging the side of said chamber and forming a fluid-tight joint therewith, retaining means for said valve member, and means for locally distorting said valve member in order selectively to close the said ports.

6. A distributing valve mechanism comprising a valve chamber having a plurality of ports in one end thereof, a resilient valve member disposed in said chamber opposite said ports, which valve member is formed with a cup-like sealing flange engaging the side of said chamber and forming a fluid-tight joint therewith, retaining means for said valve member, a plurality of resilient projecting valve parts on the inner side of said valve member and cooperating respectively with said ports and means operative upon the outer side of said valve member selectively to move said valve parts into engagement with said ports.

GEORGE BOWMAN.
GEORGE CHARLES BURGESS.